United States Patent
Jinks et al.

(10) Patent No.: US 7,653,711 B2
(45) Date of Patent: Jan. 26, 2010

(54) METHOD AND SYSTEM FOR INFORMATION DISTRIBUTION

(75) Inventors: William Richard Jinks, Havant (GB); Gary Paul Noble, Near Broadway (GB)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 10/548,930

(22) PCT Filed: May 17, 2004

(86) PCT No.: PCT/EP2004/050824

§ 371 (c)(1),
(2), (4) Date: Sep. 12, 2005

(87) PCT Pub. No.: WO2005/116882

PCT Pub. Date: Dec. 8, 2005

(65) Prior Publication Data

US 2006/0248175 A1    Nov. 2, 2006

(30) Foreign Application Priority Data

May 23, 2003   (GB) ................................. 0312054.0

(51) Int. Cl.
*G06F 15/173* (2006.01)
(52) U.S. Cl. ........................ 709/223; 709/224; 709/225; 709/226
(58) Field of Classification Search ................ 709/223, 709/224, 225, 226
See application file for complete search history.

(56) References Cited

U.S. PATENT DOCUMENTS

| 5,892,909 | A | * | 4/1999 | Grasso et al. ............... 709/201 |
| 6,453,438 | B1 | | 9/2002 | Miller et al. |
| 6,529,882 | B1 | | 3/2003 | Park et al. |
| 6,625,652 | B1 | * | 9/2003 | Miller et al. ................ 709/227 |
| 2002/0126120 | A1 | | 9/2002 | Snowdon et al. |
| 2004/0221012 | A1 | * | 11/2004 | Heumesser ................ 709/206 |

FOREIGN PATENT DOCUMENTS

| WO | WO 01/08020 | 2/2001 |
| WO | WO 02/103570 | 12/2002 |

* cited by examiner

*Primary Examiner*—Kevin Bates
*Assistant Examiner*—Chau D Le
(74) *Attorney, Agent, or Firm*—Schmeiser, Olsen & Watts; William H. Steinberg (57) ABSTRACT

A method and system for information distribution. A response to a message is received from a first member of a group G of a cascade of groups. The cascade of groups includes at least two groups. The message originated from a member of an originating group. The message was adapted to be sent one group at a time in accordance with a specified delivery sequence to each group of the cascade of groups. The message was received by the group G. The originating group does not include the first member. The response falls into a first response class of a plurality of response classes. A category of membership in the originating group is assigned to the first member. The category of membership is based on the first response class.

20 Claims, 6 Drawing Sheets

METHOD AND SYSTEM FOR INFORMATION DISTRIBUTION

TECHNICAL FIELD

This invention relates to the field of information distribution. In particular, the invention relates to cascading information to on-line groups or communities of users and dynamically evolving membership of the groups by the users.

BACKGROUND ART

Messaging services connected by a network have developed as a fast means of communication with a wide audience of users. The network may be a local area network (LAN) consisting of a few users or a wide area network (WAN) with users distributed over a vast geographic area For example, the Internet has worldwide coverage and is a frequently used network for messaging. Messaging via any form of network is defined herein as on-line messaging.

Users are collected into groups with each user being a member of any number of groups. The groups may evolve naturally or be artificially created. Groups may be defined by an infinite number of topics such as geographic location, language, profession, religion, common interest, etc. Within a group messages can be distributed to every member or subsets of the members. Messages often take the form of questions looking for information sent by one member of a group referred to as group collaboration.

The increased use of on-line messaging services for group collaboration has introduced messaging overload. Over time, messaging overload will reduce the efficiency of such group collaboration.

Examples of messaging scenarios which illustrate the problems of group collaboration messaging are as follows.

- Questions may be aimed at a group where no-one knows the answer.
- Each user does not have knowledge of what other groups may be able to answer a question.
- Submission of questions to an "everyone" group, in the hope of an answer. As the on-line community expands, this can develop into "spam", so users often turn off their subscription to the "everyone" group. Thus the question may not be seen by someone who can answer it.

The explosion in messaging and the reduction in efficiency also increases the capacity requirements for central IT facilities. For example, directory services may become overloaded and network bandwidth may not cope with the volume of communication. These problems result in delays and inefficiency in messaging.

The aim of the present invention is to extend and introduce new capabilities in making connections between groups or communities in an on-line environment and to improve the efficiency of collaboration between on-line users.

DISCLOSURE OF INVENTION

According to a first aspect of the present invention there is provided a system for information distribution including: a plurality of users; a plurality of groups wherein a user is a member of any number of the groups; and a message having an originating group or groups and defining a cascade of groups to which the message is to be sent; wherein the membership of the originating group or groups by a user evolves based on the response made by the user to the message.

Preferably, there is provided a means for a message to traverse the plurality of groups and be received by users who are not members of the originating group or groups.

A message may have an originating user and the originating group or groups is one or more of the groups of which the originating user is a member. Preferably, the groups in the cascade are not limited to the groups of which the originating user is a member.

Means may be provided for the originating user to configure the cascade, the configuration including authorising the next stage of the cascade and stopping the cascade.

Preferably, the membership of the originating group or groups has a plurality of different categories. The categories may include a participating member, a contributor and an observer.

Preferably, the response made by a user to the message is one of a number of different types of response, including no action, an observation, and a contribution. The membership of the originating group or groups may evolve to a category of membership based on the type of response made.

There may be provided a means for storing relationships between groups as the basis for cascades, the means having an interface for management of the relationships. There may be provided a group administrator for managing the membership of a group. A group may have rules for membership and movement between categories of membership.

A message may be tagged with the path it takes through the groups to ensure that a user does not receive a message twice due to membership of multiple groups.

The users may be users of a network and the message is sent and received via the network According to a second aspect of the present invention, there is provided a method for information distribution including: an originating user creating a message; the originating user selecting an originating group or groups for the message from the one or more groups of which the originating user is a member; the originating user defining a cascade of groups to which the message is to be sent; wherein membership of the originating group or groups by a user receiving the message evolves based on the response made by the receiving user to the message.

The originating user may be prompted to authorise each stage of the cascade and the originating user may stop the cascade.

According to a third aspect of the present invention there is provided a computer program product stored on a computer readable storage medium comprising computer readable program code means for performing the steps of: creating a message from an originating user; selecting an originating group or groups for the message from the one or more groups of which the originating user is a member; defining a cascade of groups to which the message is to be sent; evolving membership of the originating group or groups by a user receiving the message based on the response made by the receiving user to the message.

BRIEF DESCRIPTION OF THE DRAWINGS

Embodiments of the present invention will now be described, by way of examples only, with reference to the accompanying drawings in which:

FIGS. 4A and 4B are representations of group memberships before and after a message is sent and responded to.

MODE FOR THE INVENTION

In a network of on-line users, the users may belong to any number of groups or communities defined by common interests, geographical location, work place or any other topic or common denominator.

Figure 1:
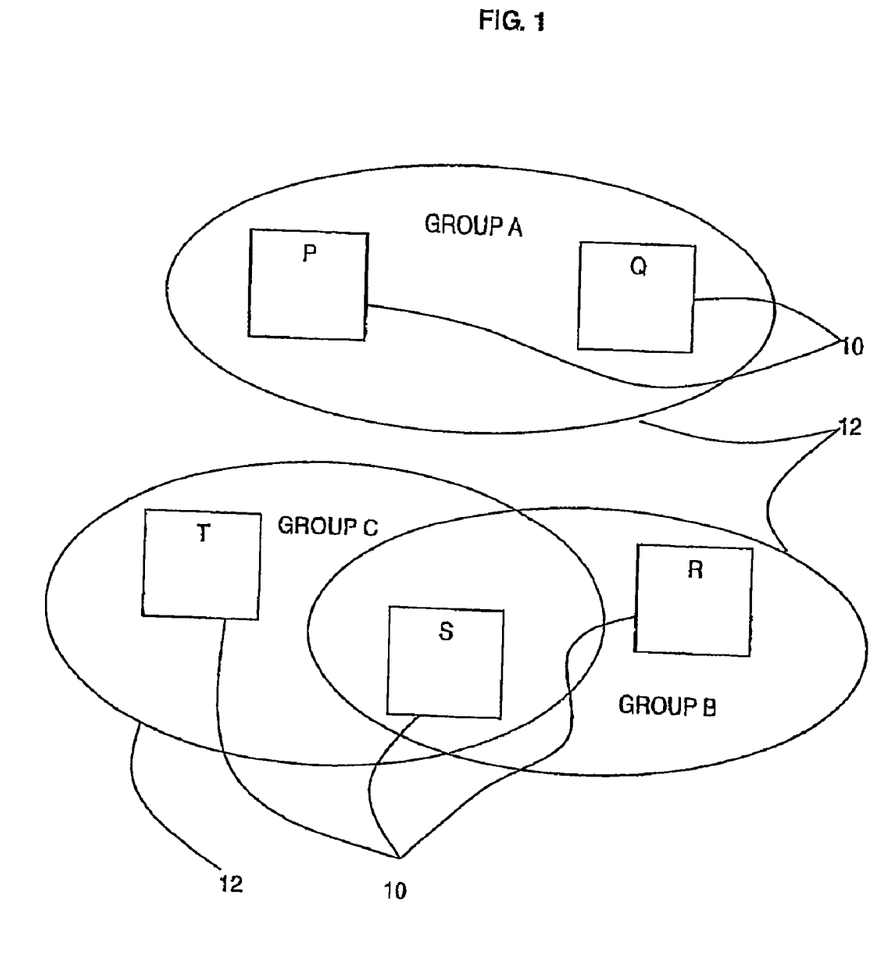
FIG. 1 is a representation of users and groups in accordance with the present invention.

FIG. 1 shows a simple arrangement of a plurality of users 10 and their membership of different groups 12. In FIG. 1, users P and Q are members of group A. Users S and R are members of group B. User S is also a member of group C as well as user T. This arrangement is used to illustrate the invention in simple relationships. In practice, the number of users and the diversity of groups will be much greater.

The users 10 are all connected via a network such that messages can be sent from any one user to any other one or more users.

Figure 2:
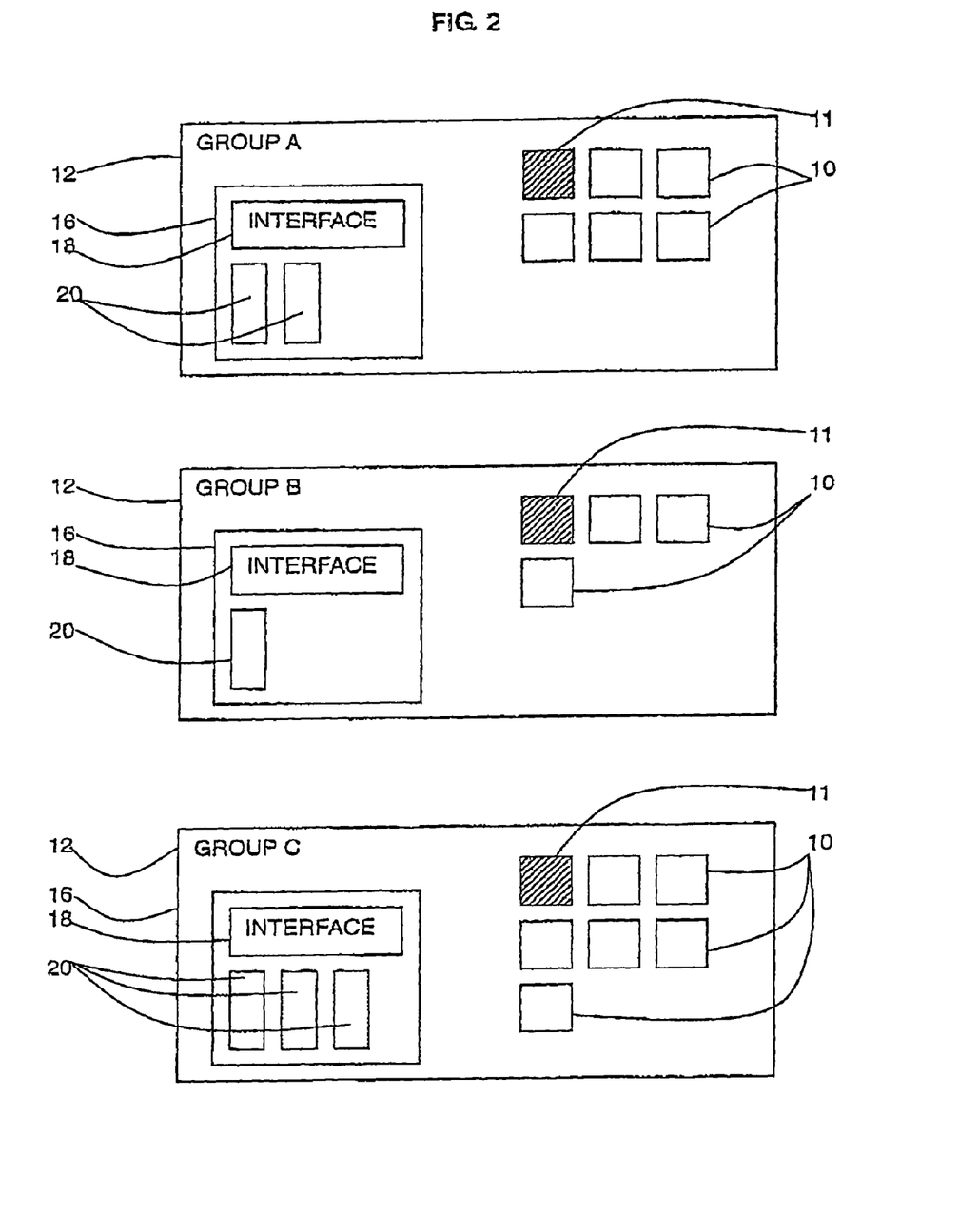
FIG. 2 is a representation of a plurality of groups in accordance with the present invention.

FIG. 2 shows a system with three groups 12 with members 10. Each group 12 has an administrator 11 or group owner. The administrator 11 may be one of the group members 10. Each group 12 includes a mechanism 16 for storing relationships between the groups 12.

The mechanism 16 includes an interface 18 for the administrator 11 to manage the relationships between groups 12. In one embodiment, the mechanism 16 stores the relationships as a list 20 of groups to try in order, referred to as a cascade. There may be one or more such lists 20 starting from a particular group 12.

A message sent by a member 10 from a first group A can traverse groups 12 and thereby be received by users who are not members of the originating first group A. The message can follow one of the lists 20 of groups as the defined relationships with the other groups 12. As an alternative, the message can follow a subset of the defined relationships selected by the message originator.

Figure 3:
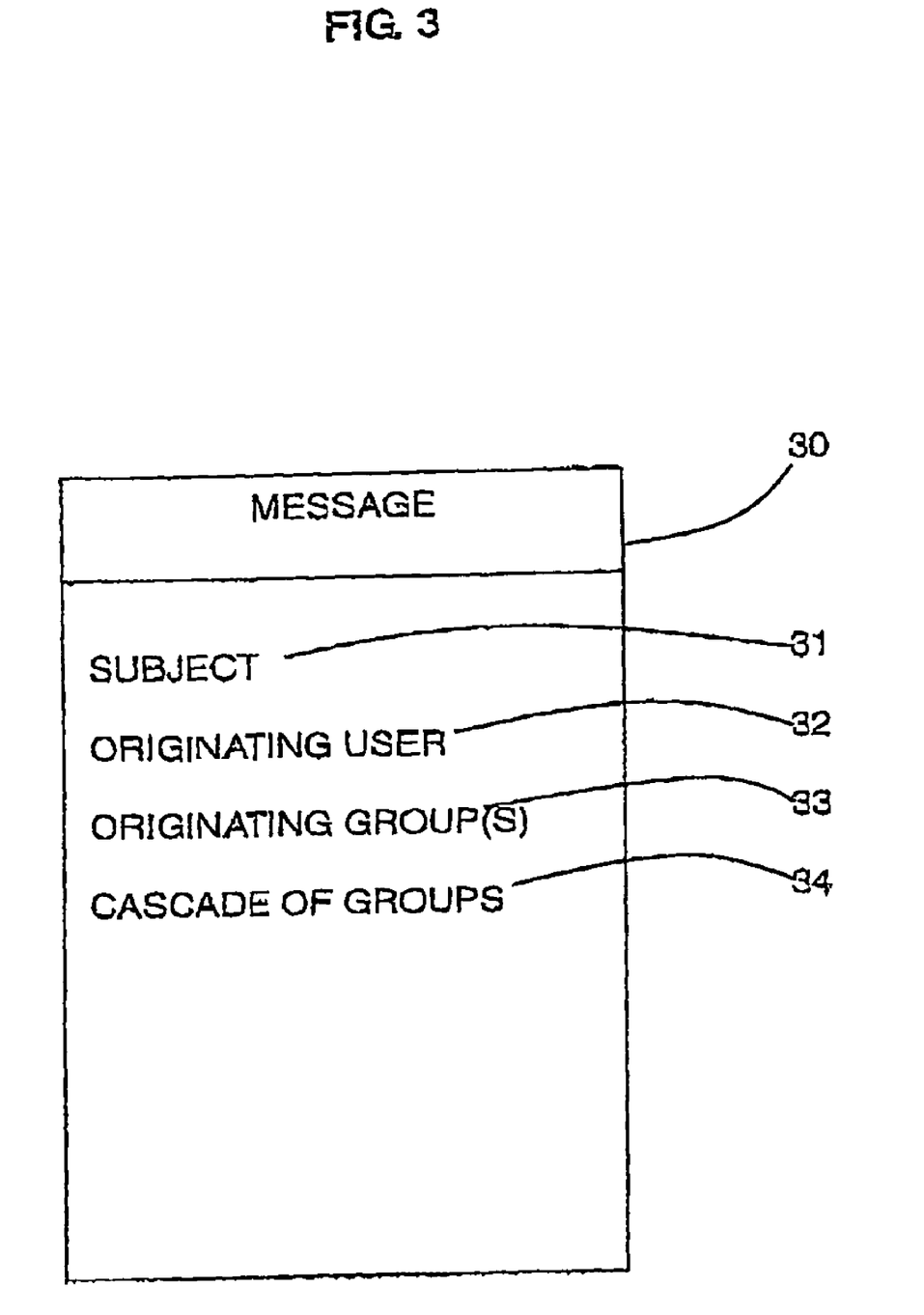
FIG. 3 is a representation of a message in accordance with the present invention.

A message 30 as show in FIG. 3, has a subject 31, an originator 32 which is the user who sent the message 30, an originating group or groups 33 which is one or more of the groups selected by the user from the set of groups the user is a member of, and the cascade 34 of groups in the order to which the message 30 is to be sent The message originator 32 is able to configure the cascade 34. Configuration of the cascade includes the user who is the originator 32 having: the ability to be prompted and authorise each stage of the cascade; the ability to stop the cascade after a predefined time limit; and the ability to stop the cascade immediately. If the user is prompted to authorise the next stage of the cascade 34, the system will prompt the user with the next groups in the cascade. The user can select a subset of these groups to follow, eliminating groups that are deemed by the user to be less relevant to the particular message.

A user can participate in multiple groups and each group has multiple tiers of participation. This takes the form of different categories of membership, as follows:

"Member"—The user has been assigned into the group by the group owner and is a full participant in the group.

"Contributor"—The user has contributed to the group and thus their participation in the group is implied.

"Observer"—The user has expressed an interest in the proceedings of the group and thus participation in the group is requested.

A system is provided to store and manage the relationships between users and groups. Existing directory services can be used to implement the relationship types of group membership. For example, an Internet Directory Service could be used.

A mechanism is provided for a recipient user to respond to a message in a number of different ways. If the message is from a group to which the recipient user does not belong, the form of response is a response class that will dictate the form of future membership of the recipient user with the originating group. The forms of response which may be generated are response classes as follows:

No response—Do not wish to handle.

A "content" response—Wish to handle now.

An "interest" response—Wish to handle later or wish to observe.

A recipient user will receive a message display with selectable options for the possible forms of response to the message which then automatically categorise the form of response made.

A protocol is provided for the dynamic creation of relationships between users and groups based on the message/response pair, as follows:

A user receives a message that originates from a group to which they do not belong. The user responds to the message with a "content" response. A "contributor" relationship is then implied from the user to the originator group.

A user receives a message that originates from a group to which they do not belong. The user responds to the message with an "interest" response. An "observer" relationship is then implied from the user to the originator group.

Figure 4A:
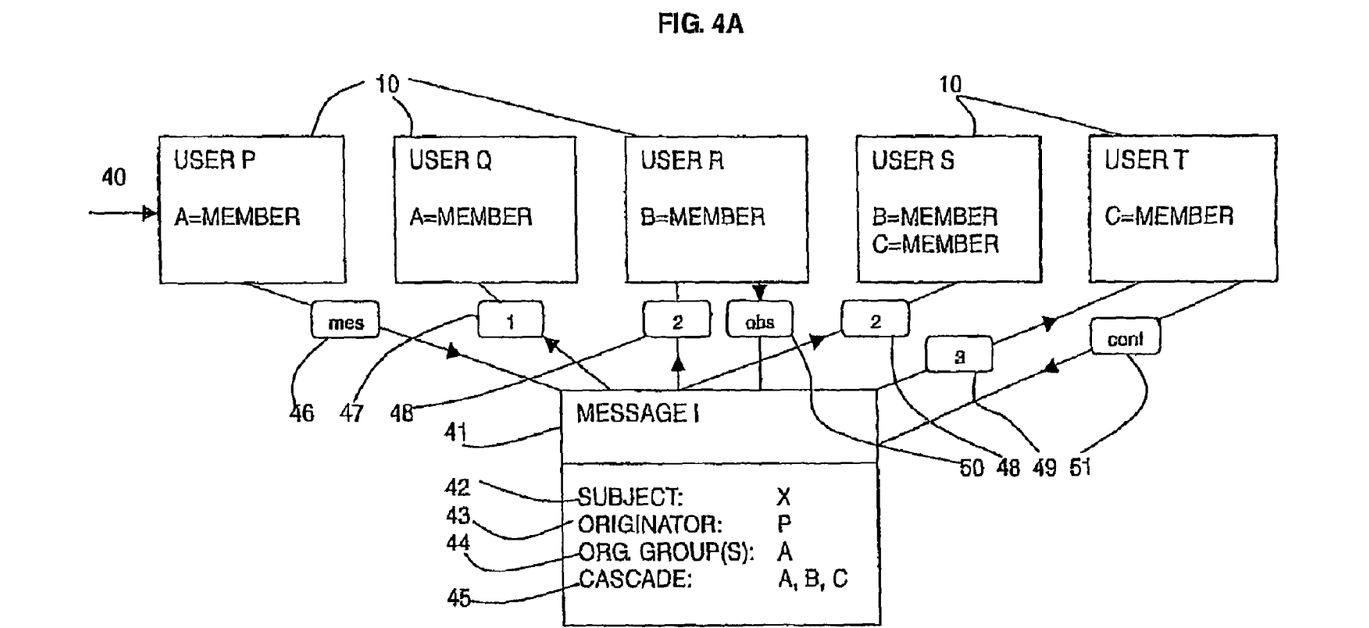
Figure 4B:
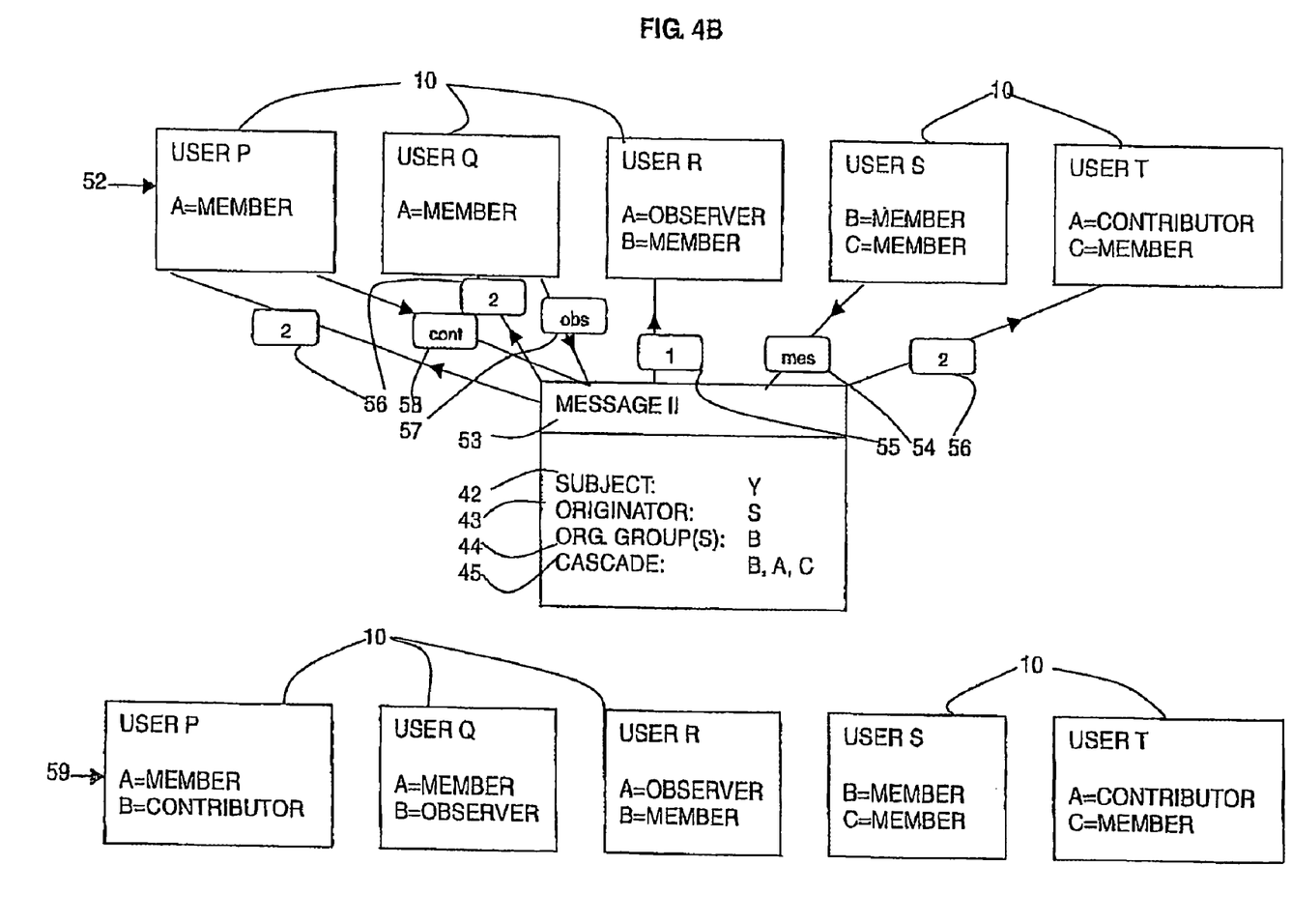

Referring to FIGS. 4A and 4B, an example of the evolution of membership of groups is shown. In FIG. 4A, five users 10 are shown and each user 10 is a member of one or more groups. The user's 10 membership of groups at a first time 40 is shown at the top of the figure.

One of the users 10, user P, creates a message 41. The message 41 has the following information tagged to it. A subject 42 which is designated as X. The originator 43 which is user P. The originating group or groups 44 which may be any one or more groups to which user P belongs, chosen by user P. In this case P only belongs to group A and therefore the originating group 44 is group A. A cascade 45 specifies a group delivery sequence configured by user P which is a list of groups in the order in which the message is to be distributed. In this case the cascade 45 is group A, followed by group B, followed by group C.

User P then sends the message 41. The message 41 is first sent 47 to other members of group A which in this example is only user Q. The message 41 is then sent in a second wave 48 to members of group B which in this example are user R and user S. The message 41 is then sent in a third wave 49 to members of group C which in this example are user S and user T.

User S has already been sent the message 41 as a member of group B and therefore does not get sent the message a second time.

A mechanism is provided to prevent an individual user 10 from receiving a message 41 more than once due to membership of multiple groups as the message 41 cascades through the network of groups. Each message 41 is tagged with the path it takes through the network of groups.

For example, message 41 may keep a record of the addresses of each user 10 to which the message 41 has been sent. If an address of a user 10 is repeated, the message 41 is not sent to the user 10 after the first transmission to that user 10.

Alternatively, the message 41 may keep a record of each group. At each cascade, the user set can be derived as the users which are members of the new groups who are not members of the previous groups.

User R responds to the message 41 with an observation 50 which is a form of an "interest" response as defined previously. User T responds to the message with a contribution 51 which is a form of a "content" response as defined previously.

The originating user has the control of when to terminate a cascade. If a message is answered early on in the transmission cascade, the originating user may decide to stop the subsequent transmissions. The originating user may be prompted at each stage of the cascade to authorise the next wave of transmissions. In the example shown in FIG. 4A, user R responds 50 to the message 41 with an observation. If user R had responded to the message with a contribution that answered the message 41, the originating user, user P, would have the choice of terminating the cascade 45 without sending the message to the members of group C.

The observation 50 made by user R and the contribution 51 made by user T result in changes to the group membership of user R and user T. User R becomes an observer of group A and user T becomes a contributor of group A.

Referring now to FIG. 4B, the users 10 at time 52 at the bottom of FIG. 4A, are shown at the top of FIG. 4B. A new message 53 is now created 54 by user S.

The message 53 has the following information tagged to it. A subject 42 which is designated Y. The originator 43 which is user S. The originating group or groups 44 which may be any one or more of the groups to which user S belongs, chosen by user S. In this case user S belongs to groups B and C and user S chooses an originating group 44 as group B. A cascade 45 configured by user S which is a list of groups in the order in which the message is to be distributed. In this case the cascade 45 is group B, followed by group A, followed by group C.

User S then sends the message 53. The message 53 is first sent 55 to other members of group B which in this example is only user R. The message 53 is then sent in a second wave 56 to members of group A which in this example are users P and Q which are full members of group A and user T which is a contributor of group A. User R is an observer of group A but has already been sent the message 53 as a member of group B and therefore is not sent the message 53 a second time. There are no members of group C who have not already received the message 53 and therefore the cascade 45 is terminated.

User P responds to the message 53 with a contribution 57 and user Q responds to the message 53 with an observation. These responses by users P and Q result in the further evolution of the membership of the groups. User P becomes a contributor to group B and user Q becomes an observer of group B. This is shown in the updated memberships of the users 10 shown at time 59 at the bottom of FIG. 4B.

A mechanism is provided for messages to be replayed to a user after a time period. This may arise in the following situations.

The user indicated an interest to answer later, but has not yet responded.

The user has been off-line for a period and requests messages to be relayed.

The user has come on-line and could answer a question that is still open and within a reasonable time period.

A mechanism is provided for the administrator of a group to view and manage the group membership including the categories of full members, contributors and observers. The group administrator can also manipulate the group's membership manually.

Figure 5:
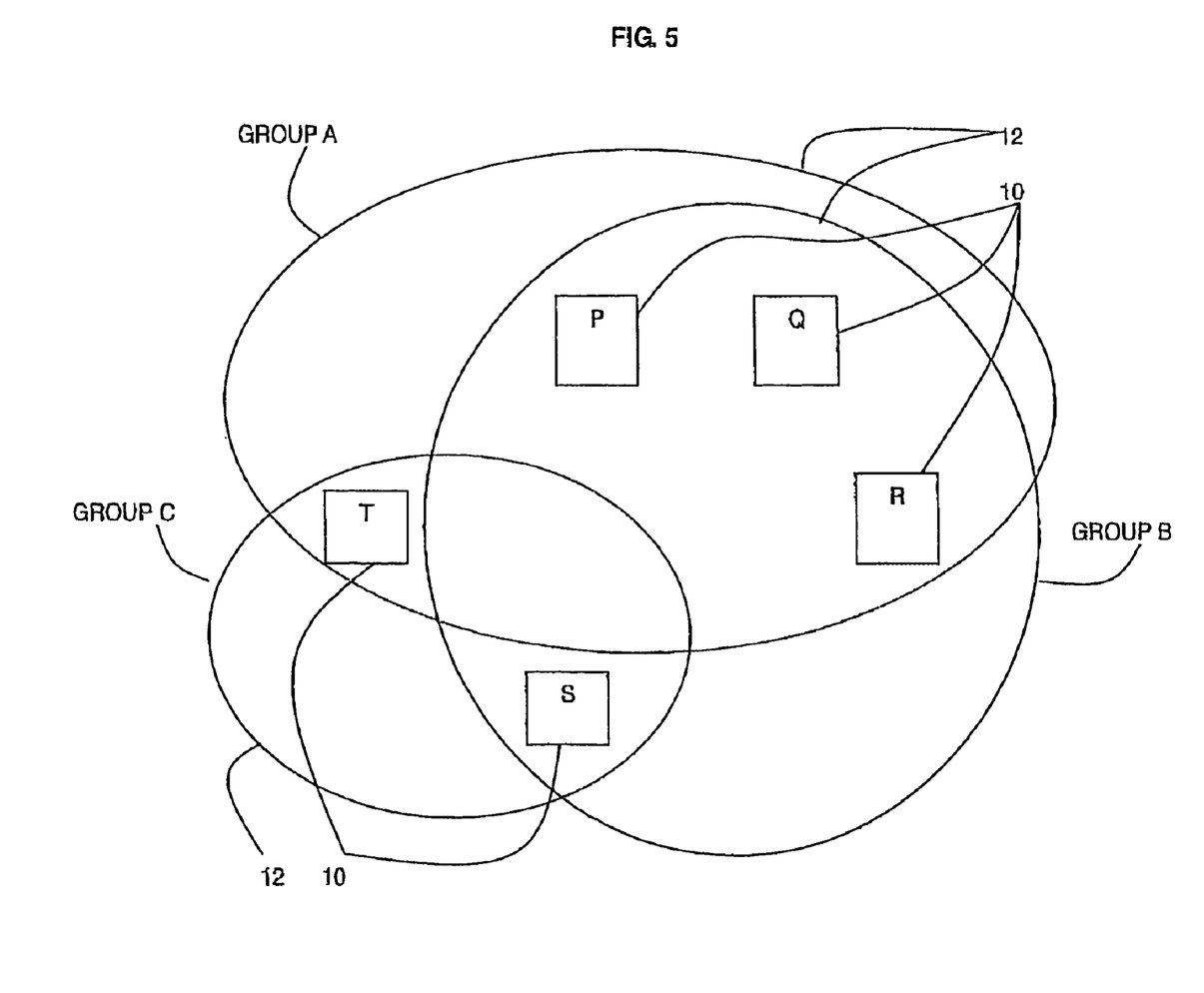
FIG. 5 is the representation of FIG. 2 amended to show the change in membership after the messages of FIGS. 4A and 4B.

FIG. 5 is a version of FIG. 1 showing how the membership of the groups 12 by the users 10 has evolved after the messages 41, 53 of FIGS. 4A and 4B have been processed.

The table given below shows the changes in membership of groups A and B after the messages 41, 53 of FIGS. 4A and 4B have been processed.

Group A

TABLE 1

| Start | After Message 41 | After Message 53 |
|---|---|---|
| User P (Member) | User P (Member) | User P (Member) |
| User Q (Member) | User Q (Member) | User Q (Member) |
|  | User R (Observer) | User R (Observer) |
|  | User T (Contributor) | User T (Contributor) |

Group B

TABLE 2

| Start | After Message 41 | After Message 53 |
|---|---|---|
| User R (Member) | User R (Member) | User R (Member) |
| User S (Member) | User S (Member) | User S (Member) |
|  |  | User P (Contributor) |
|  |  | User Q (Observer) |

In this way, group membership can evolve based on the level of interest shown to messages by users outside a group from which the message originated. The level of interest is defined in this example as contributions or observations. Many additional levels of interest may be defined resulting in further tiers of membership of a group.

In addition, if a user subsequently does not respond to messages from a group for a pre-determined period of time, the user's membership level of that group may evolve to reflect a lapse of interest in the messages of the group. This can be manipulated manually by the group administrator at the group administrator's discretion.

Alternatively, a group can have a set of rules governing membership of the group. For contributors, this could be the number of responses that warrant conversion to full membership. For observers, this could be a timeout after which the observer is deleted from the group if no contribution is forthcoming. Rules may also allow a group to accept or not accept contributors or observers. In the case of not accepting contributors or observers, a message is delivered and responses received but no new user/group relationships are formed.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

The invention claimed is:

1. A method for information distribution, said method implemented via execution by a computer of a set of program instructions stored on a storage medium and read from the storage medium, said method comprising:

specifying a group delivery sequence for sending a message to each group of a cascade of groups, said cascade of groups consisting of at least two groups, each group of the cascade of groups comprising at least one member, the at least one member of each group of the cascade of groups differing from the at least one member of each other group of the cascade of groups, said group delivery sequence being a sequential ordering of the groups of the cascade of groups;

specifying a message configured to be sent to each group of the cascade of groups one group at a time in accordance with the specified group delivery sequence;

receiving a response to the message from a first member of a group G of the cascade of groups, said message having been sent to the group G from a member of an originating group of the cascade of groups, said specifying the group delivery sequence message and said specifying the message having been performed before the message has been sent to any group of the cascade of groups, said originating group not comprising the first member, said response falling into a first response class of a plurality of response classes; and assigning to the first member a category of membership in the originating group resulting in the first member becoming a member of the originating group in accordance with the category of membership, said category of membership being based on the first response class, said originating group configured to receive a subsequent message such that each member of the originating group receives the subsequent message.

2. The method of claim 1, wherein the cascade of groups comprises the originating group.

3. The method of claim 1, wherein the response classes comprise a content response class and an interest response class, wherein the category of membership assigned to the first member is a contributor category of membership if the response by the first member falls into the content response class, wherein the category of membership assigned to the first member is an observer category of membership if the response by the first member falls into the interest response class, wherein the response by the first member falls into the content response class if the response by the first member includes a contribution to the originating group, and the response by the first member falls into the interest response class if the response by the first member includes an expression of interest in the originating group but does not includes a contribution to the originating group.

4. The method of claim 1, wherein the message comprises data therein for preventing the message from being sent more than once to a member of at least two groups of the cascade of groups.

5. The method of claim 4, wherein the data indicates each group of the cascade of groups the message has been previously sent to.

6. The method of claim 4, wherein the data indicates an address of each member of the groups of the cascade of groups the message has been previously sent to.

7. The method of claim 1, wherein the first member is also a member of a second group of the cascade of groups.

8. The method of claim 1, wherein the method further comprises terminating the cascade of groups such that the message will not subsequently be sent to any group of the cascade of groups to which the message has not already been sent.

9. The method of claim 1, wherein after said assigning the method further comprises reversing said assigning such that the first member is no longer assigned the category of membership in the originating group.

10. The method of claim 1, wherein the message is tagged with information comprising an identification of a subject, an identification of the first member, an identification of the originating group, and a description of the group delivery sequence.

11. A computer program product comprising a set of program instructions stored on a storage medium, said program instructions adapted to be read from the storage medium and executed by a computer to implement a method for information distribution, said method comprising:

specifying a group delivery sequence for sending a message to each group of a cascade of groups, said cascade of groups consisting of at least two groups, each group of the cascade of groups comprising at least one member, the at least one member of each group of the cascade of groups differing from the at least one member of each other group of the cascade of groups, said group delivery sequence being a sequential ordering of the groups of the cascade of groups;

specifying a message configured to be sent to each group of the cascade of groups one group at a time in accordance with the specified group delivery sequence;

receiving a response to the message from a first member of a group G of the cascade of groups, said message having been sent to the group G from a member of an originating group of the cascade of groups, said specifying the group delivery sequence message and said specifying the message having been performed before the message has been sent to any group of the cascade of groups, said originating group not comprising the first member, said response falling into a first response class of a plurality of response classes; and assigning to the first member a category of membership in the originating group resulting in the first member becoming a member of the originating group in accordance with the category of membership, said category of membership being based on the first response class, said originating group configured to receive a subsequent message such that each member of the originating group receives the subsequent message.

12. The computer program product of claim 11, wherein the cascade of groups comprises the originating group.

13. The computer program product of claim 11, wherein the response classes comprise a content response class and an interest response class, wherein the category of membership assigned to the first member is a contributor category of membership if the response by the first member falls into the content response class, wherein the category of membership assigned to the first member is an observer category of membership if the response by the first member falls into the interest response class, wherein the response by the first member falls into the content response class if the response by the first member includes a contribution to the originating group, and the response by the first member falls into the interest response class if the response by the first member includes an expression of interest in the originating group but does not includes a contribution to the originating group.

14. The computer program product of claim 11, wherein the message comprises data therein for preventing the message from being sent more than once to a member of at least two groups of the cascade of groups.

15. The computer program product of claim 11, wherein the message is tagged with information comprising an identification of a subject, an identification of the first member, an identification of the originating group, and a description of the group delivery sequence.

16. A system comprising a computer adapted to read and execute a set of program instructions stored on a storage medium to implement a method for information distribution, said method comprising:

specifying a group delivery sequence for sending a message to each group of a cascade of groups, said cascade of groups consisting of at least two groups, each group of the cascade of groups comprising at least one member, the at least one member of each group of the cascade of groups differing from the at least one member of each other group of the cascade of groups, said group delivery sequence being a sequential ordering of the groups of the cascade of groups;

specifying a message configured to be sent to each group of the cascade of groups one group at a time in accordance with the specified group delivery sequence;

receiving a response to the message from a first member of a group G of the cascade of groups, said message having been sent to the group G from a member of an originating group of the cascade of groups, said specifying the group delivery sequence message and said specifying the message having been performed before the message has been sent to any group of the cascade of groups, said originating group not comprising the first member, said response falling into a first response class of a plurality of response classes; and assigning to the first member a category of membership in the originating group resulting in the first member becoming a member of the originating group in accordance with the category of membership, said category of membership being based on the first response class, said originating group configured to receive a subsequent message such that each member of the originating group receives the subsequent message.

17. The system of claim 16, wherein the cascade of groups comprises the originating group.

18. The system of claim 16, wherein the response classes comprise a content response class and an interest response class, wherein the category of membership assigned to the first member is a contributor category of membership if the response by the first member falls into the content response class, wherein the category of membership assigned to the first member is an observer category of membership if the response by the first member falls into the interest response class, wherein the response by the first member falls into the content response class if the response by the first member includes a contribution to the originating group, and the response by the first member falls into the interest response class if the response by the first member includes an expression of interest in the originating group but does not includes a contribution to the originating group.

19. The system of claim 16, wherein the message comprises data therein for preventing the message from being sent more than once to a member of at least two groups of the cascade of groups.

20. The system of claim 16, wherein the message is tagged with information comprising an identification of a subject, an identification of the first member, an identification of the originating group, and a description of the group delivery sequence.

* * * * *

UNITED STATES PATENT AND TRADEMARK OFFICE
CERTIFICATE OF CORRECTION

PATENT NO.        : 7,653,711 B2                                    Page 1 of 1
APPLICATION NO.   : 10/548930
DATED             : January 26, 2010
INVENTOR(S)       : Jinks et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 953 days.

Signed and Sealed this

Twenty-third Day of November, 2010

David J. Kappos
*Director of the United States Patent and Trademark Office*